United States Patent
Kelley et al.

(10) Patent No.: US 6,182,178 B1
(45) Date of Patent: *Jan. 30, 2001

(54) METHOD AND SYSTEM FOR SUPPORTING PERIPHERAL COMPONENT INTERCONNECT (PCI) PEER-TO-PEER ACCESS ACROSS A PCI HOST BRIDGE SUPPORTING MULTIPLE PCI BUSES

(75) Inventors: Richard Allen Kelley, Apex, NC (US); Danny Marvin Neal, Round Rock; Steven Mark Thurber, Austin, both of TX (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 09/106,953

(22) Filed: Jun. 30, 1998

(51) Int. Cl.[7] .................................................. G06F 13/38
(52) U.S. Cl. ........................... 710/126; 710/107; 710/129
(58) Field of Search ................................... 710/126, 128, 710/129, 131, 101

(56) References Cited

U.S. PATENT DOCUMENTS

| | | | |
|---|---|---|---|
| 5,592,632 | * 1/1997 | Leung et al. | 710/126 |
| 5,761,462 | * 6/1998 | Neal et al. | 710/129 |
| 5,790,870 | * 8/1998 | Hausauer et al. | 710/260 |
| 5,859,988 | * 1/1999 | Ajanovic et al. | 395/309 |
| 5,887,144 | * 3/1999 | Guthrie et al. | 710/126 |
| 5,898,888 | * 4/1999 | Guthrie et al. | 710/126 |
| 5,915,101 | * 6/1999 | Kleineberg et al. | 710/128 |
| 5,935,233 | * 8/1999 | Jeddeloh | 710/128 |
| 6,081,863 | * 6/2000 | Kelley et al. | 710/129 |

* cited by examiner

*Primary Examiner*—Ayaz R. Sheikh
*Assistant Examiner*—X. Chung-Trans
(74) *Attorney, Agent, or Firm*—Volel Emile; Felsman, Bradley, Vaden, Gunter & Dillon, LLP

(57) ABSTRACT

A method and system for supporting multiple Peripheral Component Interconnect (PCI) local buses through a single PCI host bridge having multiple PCI interfaces within a data-processing system are disclosed. In accordance with the method and system of the present invention, a processor and a system memory are connected to a system bus. First and second PCI local buses are connected to the system bus through a PCI host bridge. The first and second PCI local buses have sets of in-line electronic switches, dividing the PCI local buses into PCI local bus segments supporting a plurality of PCI peripheral component slots for connecting PCI devices. The sets of in-line electronic switches are open and closed in accordance with bus control logic within the PCI host bridge allowing up to fourteen or more PCI peripheral component slots for connecting up to fourteen PCI devices to have access through a single PCI host bridge to the system bus. An internal PCI-to-PCI bridge is provided to allow a PCI device to share data with another PCI device as peer-to-peer devices across the first and second PCI local bus segments.

20 Claims, 4 Drawing Sheets

METHOD AND SYSTEM FOR SUPPORTING PERIPHERAL COMPONENT INTERCONNECT (PCI) PEER-TO-PEER ACCESS ACROSS A PCI HOST BRIDGE SUPPORTING MULTIPLE PCI BUSES

BACKGROUND OF THE INVENTION

1. Technical Field

The present invention relates in general to a method and system for data processing and, in particular, to a method and system for handling multiple Peripheral Component Interconnect (PCI) local bus accesses within a computer system. Still more particularly, the present invention relates to a method and system for handling PCI peer-to-peer access across multiple PCI local buses across a PCI host bridge supporting multiple PCI Buses within a computer system.

2. Description of the Related Art

A computer system typically includes several types of buses, such as a system bus, local buses, and peripheral buses. Various electronic circuit devices and components are connected with each other via these buses such that intercommunication may be possible among all of these devices and components.

In general, a central processing unit (CPU) is attached to a system bus, over which the CPU communicates directly with a system memory that is also attached to the system bus. In addition, a local bus may be used for connecting certain highly integrated peripheral components rather than the slower standard expansion bus. One such local bus is known as the Peripheral Component Interconnect (PCI) bus. Under the PCI local bus standard, peripheral components can directly connect to a PCI local bus without the need for glue logic, the "profusion of chips needed to match the signals between different integrated circuits." Thus, PCI provides a bus standard on which high-performance peripheral devices, such as graphics devices and hard disk drives, can be coupled to the CPU, thereby permitting these high-performance peripheral devices to avoid the general access latency and the bandwidth constraints that are associated with an expansion bus. An expansion bus such as an Industry Standard Architecture (ISA) bus, is for connecting various peripheral devices to the computer system. These peripheral devices typically include input/output (I/O) devices such as a keyboard, floppy drives, and printers.

Additionally, under the PCI local bus standard for 33 MHz operation, only four peripheral component connector slots may be attached to the PCI bus due to loading constraints on the bus. In order to overcome this technical constraint, designers may add a second or more PCI local buses that give the end user of a computer system the advantage of adding on four more slots per bus. However, a PCI host bridge is required for transferring information from the PCI bus to the system bus. Therefore, with the addition of more than one PCI local buses, designers have had to add on multiple PCI host bridges and/or PCI-to-PCI bridges for supporting the multiple PCI buses and a method for handling PCI peer-to-peer access across the multiple PCI host bridges thereby increasing the cost and complexity of the system.

Therefore, it is desirable in a PCI-based system requiring multiple PCI host bridges and/or PCI-to-PCI bridges supporting multiple PCI buses, that a single PCI host bridge support multiple PCI buses thus minimizing the number of required bridges. Furthermore, it is desirable to have a single PCI host bridge operating at 33 MHz that has the capability of supporting more than four peripheral component slots having PCI devices connected thereto. Additionally, it is desirable to support PCI peer-to-peer access across a PCI bus operating at 33 MHz within a data-processing system. The subject invention herein solves all these problems in a new and unique manner which has not been part of the art previously.

SUMMARY OF THE INVENTION

In view of the foregoing, it is therefore an object of the present invention to provide an improved method and system for data processing.

It is another object of the present invention to provide an improved method and system for handling PCI peer-to-peer accesses within a data-processing system.

It is yet another object of the present invention to provide an improved method and system for supporting PCI peer-to-peer access across more than four PCI peripheral component slots connecting PCI devices per each PCI bus operating at 33 MHz within a data-processing system.

In accordance with the method and system of the present invention, a processor and a system memory are connected to a system bus. First and second PCI local buses are connected to the system bus through a PCI host bridge. The first and second PCI local buses have sets of in-line electronic switches, dividing the PCI local buses into PCI local bus segments supporting a plurality of PCI peripheral component slots for connecting PCI devices. The sets of in-line electronic switches are open and closed in accordance with bus control logic within the PCI host bridge allowing up to fourteen or more PCI peripheral component slots for connecting up to fourteen PCI devices to have access through a single PCI host bridge to the system bus. A PCI-to-PCI bridge function is provided to allow a PCI device to share data with another PCI device as peer-to-peer devices across the first and second PCI local buses.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention may be applicable in a variety of computers under a number of different operating systems. The computer may be, for example, a personal computer, a mini-computer, or a mainframe computer. For the purpose of illustration, a preferred embodiment of the present invention, as described below, is implemented on a mini-computer, such as the RS/6000 (series manufactured by International Business Machines Corporation).

Figure 1:
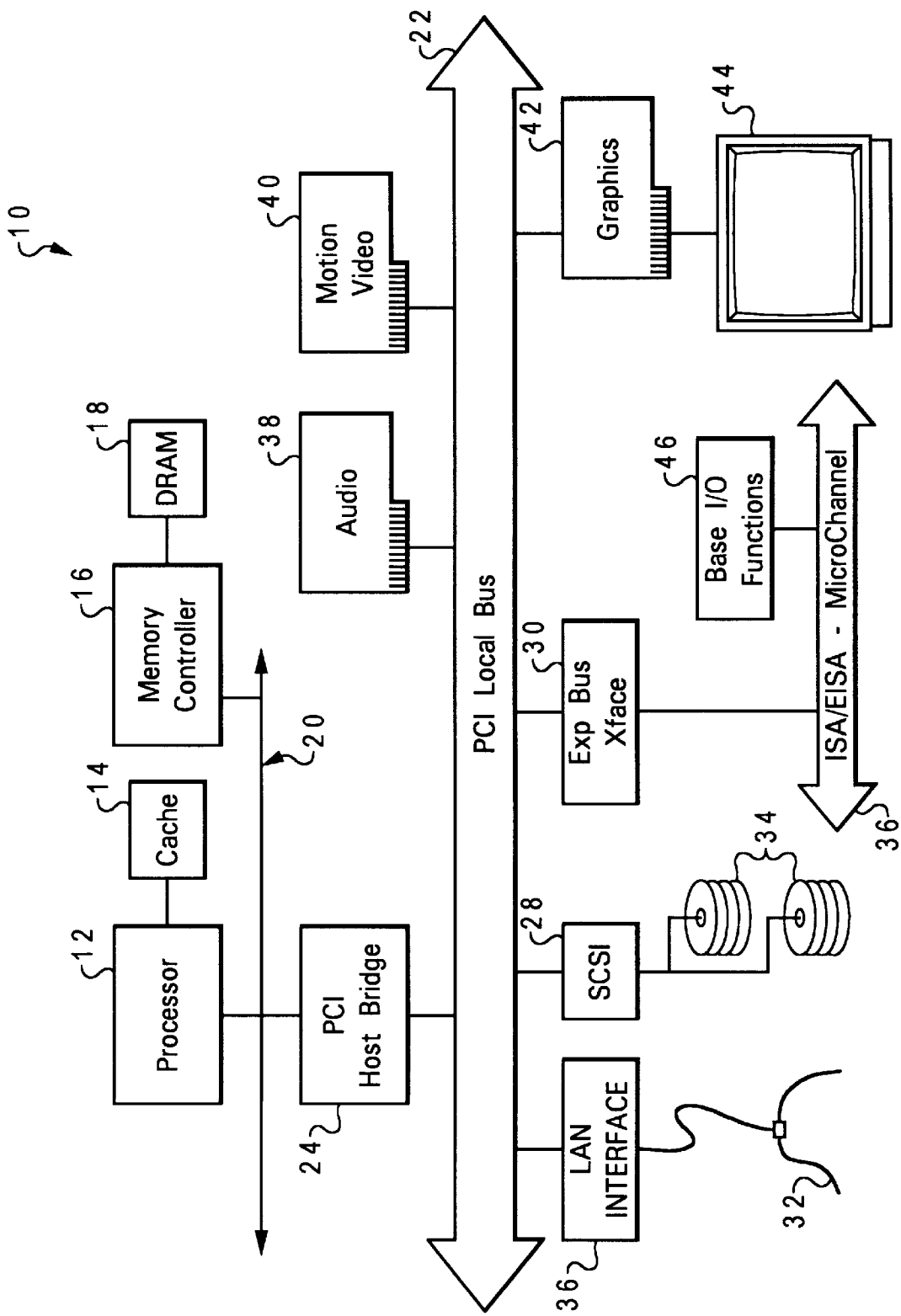
FIG. 1 is a block diagram of a typical computer system having a PCI local bus architecture, which may utilize a preferred embodiment of the present invention.

Referring now to the drawings wherein like reference numerals refer to like and corresponding parts throughout, and in particular to FIG. 1, there is depicted a block diagram of a typical computer system 10 having a PCI local bus architecture, which may utilize a preferred embodiment of the present invention. As shown in FIG. 1, a processor 12, cache memory 14, memory controller 16, and a Dynamic Random Access Memory (DRAM) 18 are all connected to a system bus 20 of a computer system 10. Processor 12, cache memory 14, memory controller 16, and DRAM 18 are also coupled to a PCI local bus 22 of computer system 10 through a PCI host bridge 24. PCI host bridge 24 provides a low latency path through which processor 12 may directly access PCI devices mapped anywhere within bus memory and/or I/O address spaces. PCI host bridge 24 also provides a high bandwidth path for allowing a PCI device to directly access DRAM 18. By way of example, but not of limitation, the PCI host bridge 24 may include various functions such as data buffering/posting and arbitration.

Referring once again to FIG. 1, also attaching to PCI local bus 22 may be other devices such as a local-area network (LAN) interface 26, a small computer system interface (SCSI) 28 and an expansion bus interface 30. LAN interface 26 is for connecting computer system 10 to a local-area network 32 such as to an Ethernet or Token-Ring. SCSI interface 28 is utilized to control high-speed SCSI disk drives 34. Expansion bus interface 30 couples any other expansion buses 36 such as an ISA bus, EISA bus, and/or MicroChannel Architecture (MCA) bus to the PCI local bus 22. Typically, various peripheral devices for performing certain basic I/O functions 46 are attached to one of expansion buses 36.

In general, PCI local bus 22 due to loading effects on the bus supports up to four add-in board connectors without requiring any expansion capability, such as adding a second PCI local bus not shown. Audio adapter board 38, motions video adapter board 40, and graphics adapter board 42 connected to a monitor 44 are examples of some devices that may be attached to PCI local bus 22 via add-in board connectors as shown in FIG. 1.

Figure 2:
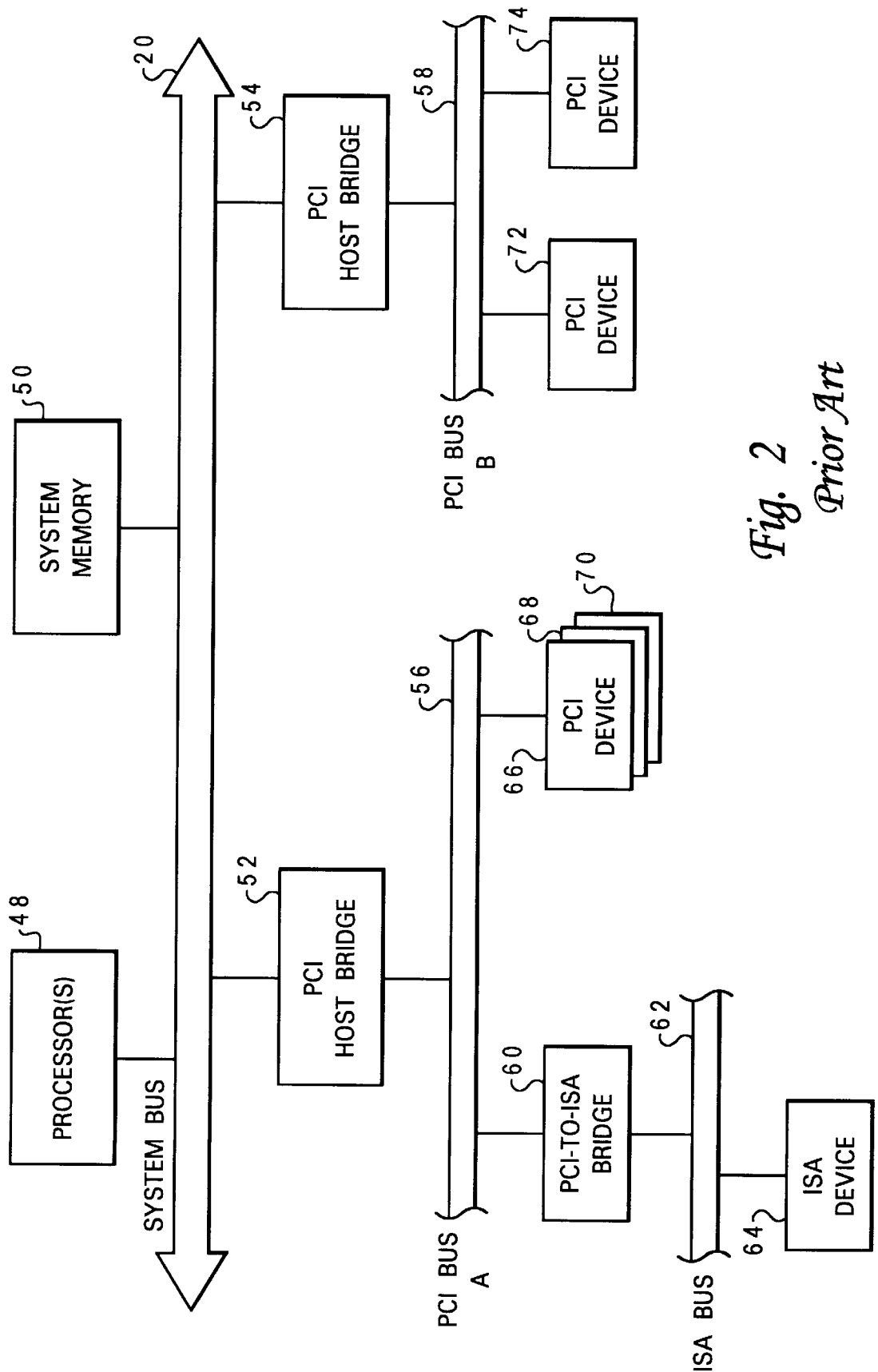
FIG. 2 is a block diagram of a prior art configuration having separate PCI local buses under separate PCI host bridges.

With reference now to FIG. 2, there is illustrated a prior art configuration having separate PCI local buses under separate PCI host bridges. As shown, processor(s) 48 and a system memory 50 are coupled for communication over a system bus 20. By way of example but, not of limitation, system bus 20 provides a 32-bit memory address space and a 16-bit I/O address space. A PCI host bridge 52 enables communications between bus agents coupled to system bus 20 and bus agents coupled to a PCI local bus A 56. Further, a PCI-to-ISA bridge 60 enables communications between bus agents (ISA device 64) coupled to an ISA bus 62 (ISA bus 62 is an expansion bus) and system memory 50. PCI-to-ISA bridge 60 also enables communications between processor(s) 48 and bus agents (ISA device 64) coupled to the ISA bus 62.

Referring once again to FIG. 2, PCI devices 66, 68 and 70 are bus agents coupled for communication over PCI local bus A 56. In addition, PCI host bridge 52 and PCI-to-ISA bridge 60 are coupled as bus agents for communication over PCI local bus 56. PCI host bridge 52 and PCI-to-ISA bridge 60 have the capability to be initiators and targets for access cycles over PCI local bus 56. Turning once again to FIG. 2, in addition to PCI host bridge 52, a second PCI host bridge 54 is also attached to system bus 20. Similar to PCI host bridge 52, PCI host bridge 54 enables communications between bus agents coupled to system bus 20 and bus agents coupled to a second PCI local bus B 58. Attaching to PCI local bus B 58 are PCI devices, such as PCI device 72 and PCI device 74.

Figure 3:
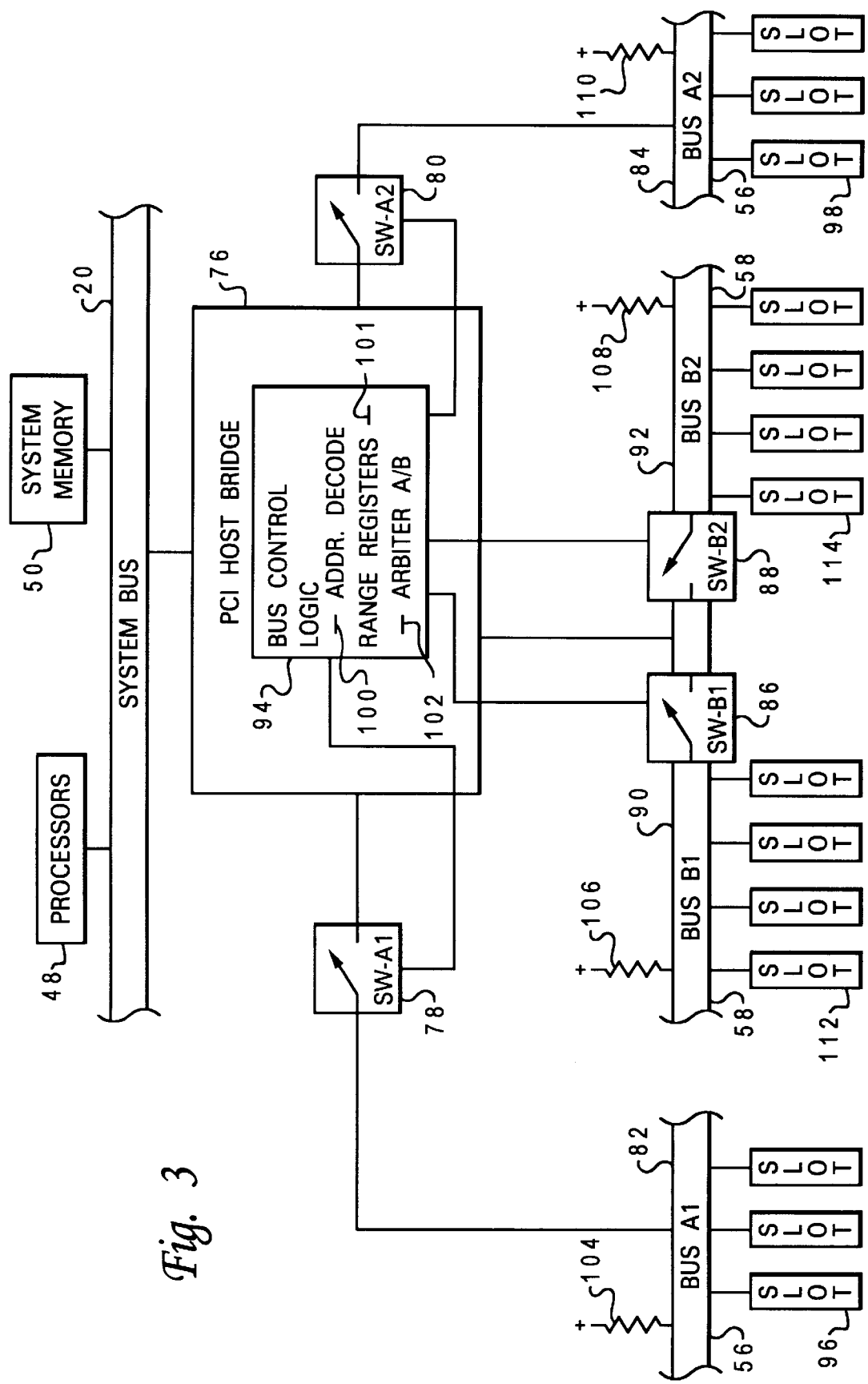
FIG. 3 is a block diagram of a PCI host bridge having separate PCI local buses in accordance with a preferred embodiment of the present invention.

Referring now to FIG. 3, there is illustrated a block diagram of a PCI host bridge 76 in accordance with the preferred embodiment of the present invention. As shown, PCI host bridge 76 may support a plurality of PCI local buses, namely, PCI local bus A 56 and PCI local bus B 58. As shown in FIG. 3, two sets of in-line electronic switches are provided for each PCI bus thereby providing bus segments for allowing more than four PCI devices to be utilized on a given bus. These sets of in-line electronic switches additionally provide the total switching mechanism for all of the appropriate PCI signals associated with PCI buses for isolation on the buses as will be more fully described below.

Referring once again to FIG. 3, two sets of in-line electronic switches SW-B1 86 and SW-B2 88 are inserted along PCI local bus B 58 creating PCI local bus segments B1 90 and B2 92, respectively. In accordance with the PCI specification, the bus loading design requirements for the PCI local bus B 58 are normally ten loads for a maximum frequency of up to 33 MHz at 33 MHz of operation. Attaching a PCI slot to the PCI bus B 58 presents itself as two loads. As shown in FIG. 3, local bus segments B1 90 and B2 92, respectively, each have attached four peripheral component slots 112 and 114 for a total of eight loads on each bus segment. The host bridge 76 adds one load and open switches on the other bus segment, PCI local bus A 56, as will be more fully described below, add one more additional load, for a total of ten loads on each local bus segment B1 90 and B2 92, respectively.

As shown in FIG. 3, the PCI local bus segments B1 90 and B2 92 each support four PCI peripheral component slots 112 and 114 (add-in board connectors) for receiving PCI devices, not shown. It should be understood that in order to meet the ten load requirement that at any one time only one set of switches may be closed on PCI local bus B 58 producing a total of ten loads. Therefore, the opening and closing of switches SW-B1 86 and SW-B2 88 effectively isolate the PCI local bus B 58 from the local effects of the segments and the four added peripheral component slots behind the open switches allows eight slots to be utilized on PCI local bus B 58, thereby eliminating the need for the second PCI host bridge 54 shown in FIG. 2.

Turning once again to FIG. 3, two sets of in-line electronic switches SW-A1 78 and SW-A2 80 are inserted along PCI local bus A 56 creating PCI local bus segments A1 82 and A2 84, respectively. As noted above, the bus loading design requirements for the PCI local bus A 56 are normally ten loads for a maximum frequency of up to 33 MHz at 33 MHz of operation. Once again, attaching a PCI slot to the PCI bus A 56 presents itself as two loads. As shown in FIG. 3, local bus segments A1 82 and A2 84 respectively, each have attached three peripheral component slots 96 and 98 for a total of six loads on each bus. The host bridge 76 adds one load and open switches SW-B1 86 and SW-B2 88 on PCI local bus B 58 add one more additional load, for a total of eight loads on each PCI local bus segments A1 82 and A2 84, respectively. As discussed above, open switches SW-A1 78 and SW-A2 80 adds an additional load on PCI local bus B 58. The three peripheral component slots 96 and 98 on each side of PCI local bus segments A1 82 and A2 84 when either switch SW-A1 78 and SW-A2 80 is closed presents six loads and is restricted to one less slot on each bus segment to allow for the added trace length of wire that may be required pass the slots in PCI local bus B 58 (which adds an approximately equivalent additional load to that bus segment).

As shown in FIG. 3, the PCI local bus segments A1 82 and A2 84 each support three PCI peripheral component slots 96 and 98 (add-in board connectors) for receiving PCI devices, not shown, while accounting for the additional load presented by the extra wiring required to bypass the slots in PCI local bus B 58. It should be understood that in order to meet the ten load requirement that at any one time only one set of switches may be closed on PCI local bus A 56. Therefore, the opening and closing of switches SW-A1 78 and SW-A2 80 effectively isolate the PCI local bus A 56 from the local effects of the segments and the three added peripheral component slots behind the open switches allows six slots to be utilized on PCI local bus A 56. Although not shown, it should be understood that PCI local bus A 56 without PCI local bus B 58 could also support eight device slots. Additionally, a single pull double throw switch may also replace the two sets of in-line electronic switches. With this configuration, fourteen peripheral component slots are supported by each PCI host bridge.

Referring once again to FIG. 3, The PCI host bridge 76 includes bus control logic 94 having an address decode 100, range registers 101 and an arbiter control 102 for controlling the sequence of turning "on" an "off" the switches SW-A1 78, SW-A2 80, SW-B1 86 and SW-B2 88, respectively, during bus operation. As mentioned before, when using either PCI local bus A 56 or bus B 58, only one set of switches, SW-A1 78 and SW-A2 80 or SW-B1 86 and SW-B2 88 are closed at a time, depending on where a master and where a target is during bus operation on either bus A 56 or bus B 58.

By way of example, but not of limitation, the bus control logic 94 for bus A 56 will be described. The arbiter 102 for bus A 56 determines where the winning master is on the bus 56. If the current controlling master is say on bus segment A1 82, then the switch SW-A1 78 is closed and switch SW-A2 80 is open when that master gains control of bus segment A1. If the operation is DMA (Direct Memory Access) to system memory 50 through the system bus 20, then the target is the host bridge 76. If the next winning arbiter is on segment A2 84, the grant line (GNT#) is removed from the master on segment A1 82, and when its latency timer expires, it gets off the bus 56 resulting in a idle cycle on the bus 56. When the bus 56 goes idle, switch SW-A1 78 is open, and SW-A2 80 is closed, and the GNT# is activated to the winning master waiting on segment A2 84. When the winning master in segment A2 84 sees its GNT# line active on the bus 56 it begins its Direct Memory Access (DMA) to system memory 50. It should be noted that the request line (REQ#) and GNT# lines (not shown) are not bused, and therefore not switched by the in-line switches SW-A1 78 and SW-A2 80. Although not described, it should be recognized that the equivalent bus control logic 94 discussed above is also provided for the in-line electronic switches SW-B1 86 and SW-B2 88 inserted along PCI local bus B 58.

Continuing from above and referring once again to FIG. 3, if the winning arbiter 102 is the PCI host bridge 76 for PCI local bus A 56, the address decode 100 and address range registers 101 in the bus controller 94 (for bus A) located in the PCI host bridge 76 is used to find the target the PCI host bridge 76 wants to access. This address decode 100 and address range registers 101 functions are handled in parallel with the arbitration 102 described above. Once a target is located, then the PCI host bridge 76 will know which set of in-line switches SW-A1 78 and SW-A2 80 need to be closed to connect the PCI host bridge 76 to the correct target. If the next target is on the same bus segment as the current controlling master, the switch states will not change until bus control is granted to the next controlling master. The address decode 100 is done to locate the target when the PCI host bridge 76 arbitrates for the PCI local bus A 56, in case the bridge wins the arbitration. When the current controlling master is on segment A1 82, the winning arbiter 102 is the PCI host bridge 76, and the target is on segment A2 84, the GNT# is removed from the master on segment A1 82, and when its latency timer expires, it gets off the PCI local bus 56 resulting in an idle cycle on the PCI local bus 56. When the PCI local bus 56 goes idle, switch SW-A1 78 is open and switch SW-A2 80 is closed and the PCI host bridge 76 now begins its access to the target on PCI local bus segment A2 84. Although not described, it should be recognized that the equivalent bus control logic 94 discussed above is also provided for the set of in-line electronic switches SW-B1 86 and SW-B2 88 inserted along PCI local bus B 58.

Turning once again to FIG. 3, for local bus segments A1 82 and A2 84 there are attached pull-up resistors 104 and 110 located on the slot 96 and 98 sides of the switches 78 and 80. Similarly, for local bus segments B1 90 and B2 92 there are attached pull-up resistors 106 and 108 located on the slot 112 and 114 sides of the switches 86 and 88. Additionally, more than two bus segments per PCI bus may be separated by set of in-line switches as long as the total bus loading requirements and timing budgets are met for a given frequency of operation. Also, more than two PCI buses can be provided by a single PCI host bridge as long as there are enough pins on the chip and the buses can be physically wired.

Figure 4:
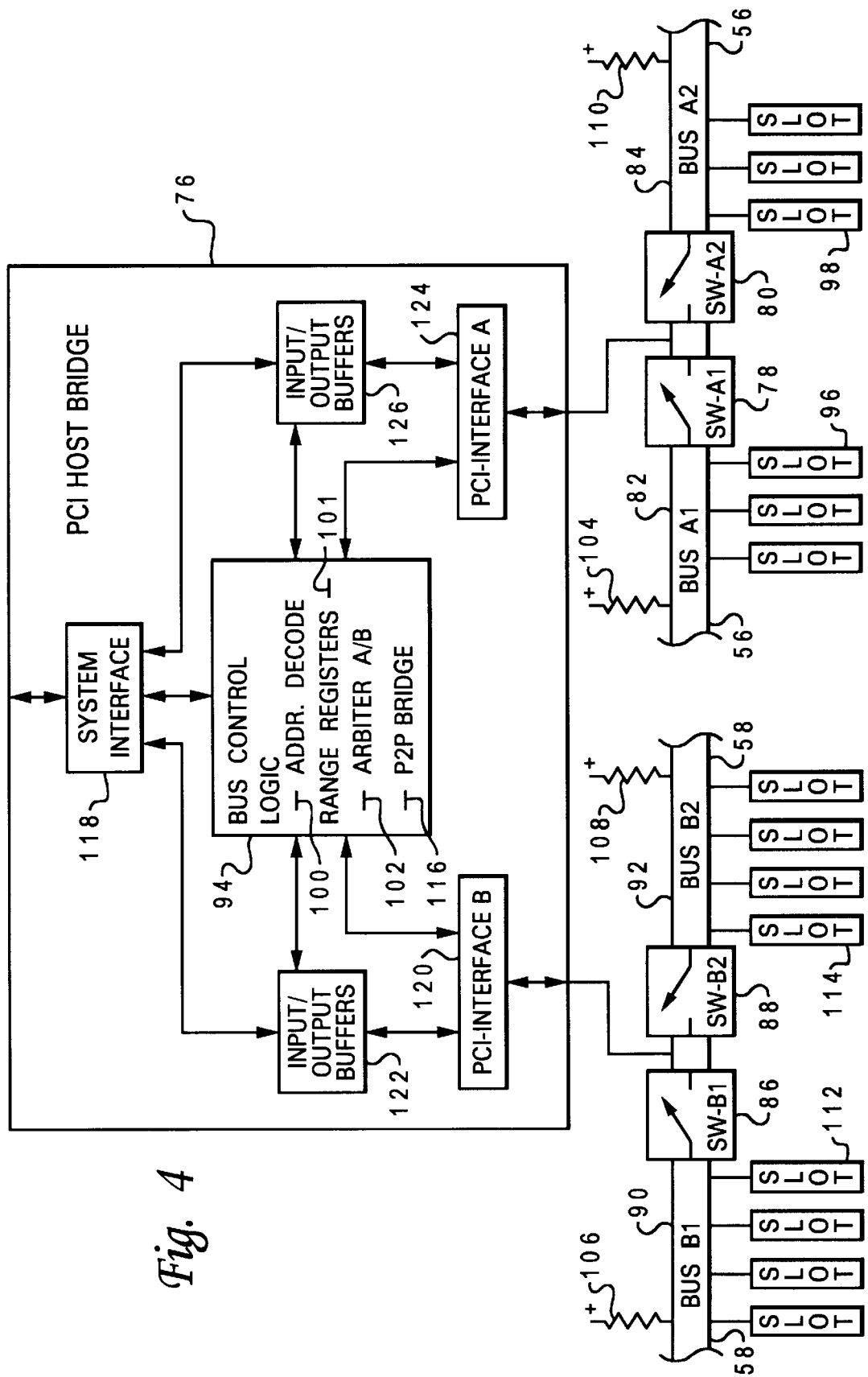
FIG. 4 is a block diagram of a PCI host bridge having a P2P bridge in accordance with a preferred embodiment of the present invention.

Referring now to FIG. 4, there is illustrated a block diagram for providing peer-to-peer support for PCI devices on PCI local bus A1 56 by adding an internal enhanced PCI-to-PCI (P2P) bridge 116 capability including PCI Interfaces B and A 120 and 124, respectively and input/output buffers 122 and 126 to the PCI host bridge 76 in accordance with the preferred embodiment of the present invention. Referring once again to FIG. 4, the P2P bridge capability 116 operates with PCI local bus segment A1 82, A2 84, B1 90 and B2 92 to provide a P2P functionality to handle peer-to-peer between these bus segments. P2P bridge operations are known in the art and therefore not discussed in detail herein, except for the added P2P bridge capability described in the preferred embodiment.

The following describes a new capability of a P2P bridge allowing the P2P bridge in conjunction with the PCI host bridge 76, address decode 100 and range registers 101 to accept a transaction as a target and then later to place the same transaction as a master out on the same PCI interface based on the location of the target. By way of example, but not of limitation, when a current controlling master is on PCI local bus segment A1 82, switches SW-A1 78 is closed and SW-A2 80 is opened thereby connecting local bus segment A1 82 to PCI host bridge 76, the transaction from the master is placed into input/output buffer 126 through PCI-Interface 124. The PCI host bridge 76 and the P2P bridge 116 (acting as potential targets) decode 100 the address of the transaction. When the address is a location in system memory, the PCI host bridge 76 responds as the target and forwards the information in the input/output buffer 126 via a separate transaction to the system via a system interface 118. When the address is for a device on PCI local bus segment A2 84, the P2P bridge 116 responds as the target and terminates the transaction as a delayed transaction or posts the transaction when the transaction is a memory write. The P2P bridge 116 then arbitrates for the local bus A 56. When the PCI interface 124 is granted access to the PCI local bus A 56, the switch control logic closes switch SW-A2 80 and opens switch SW-A1 78 connecting PCI local bus segment A2 84 to PCI local bus A 56 so that the PCI Interface 124 of the P2P bridge 116 can complete the transaction in input/output buffers 126 to the PCI device connected at PCI slot 98. It should be noted that the same sequence of events occurs on bus segments A1 82 and A2 84 when the controlling master is on segment A2 84 and the target is on segment A1 82. Similarly, the same sequence of events occurs for local bus B 58, with devices on segment B1 90 and segment B2 92 using the PCI host bridge 76 and the enhanced P2P bridge 116 in association with PCI-Interface B 120 and input/output buffer 122.

When the current controlling master is on PCI local bus segment A2 84, switches SW-A1 80 is closed and SW-A2 78 is opened thereby connecting local bus segment A2 84 to PCI host bridge 76, the transaction from the master is placed into input/output buffer 126 through PCI-Interface 124. Once again, the PCI host bridge 76 and the P2P bridge 116 (acting as potential targets) decode 100 the address of the transaction. When the address is a location in system memory, the PCI host bridge 76 responds as the target and forwards the information in the input/output buffer 126 via another transaction to the system via the system interface 118. When the address is for a device on PCI local bus segment B2 92, the P2P bridge 116 responds as the target and terminates the transaction as a delayed transaction or posts the transaction when the transaction is a memory write. The P2P bridge 116 then arbitrates for the local bus B 58. When the PCI interface 120 is granted access to the PCI local bus B 92, the switch control logic closes switch SW-B2 88 and opens switch SW-B1 86 connecting PCI local bus segment B2 92 to PCI local bus B 58 so that the PCI Interface 120 of the P2P bridge 116 can complete the transaction in input/output buffers 126 to the PCI device connected at PCI slot 114. Similarly, the same sequence of events occurs when a controlling master is on local bus B 58 and the target is in one of the slots on local bus A 56.

By way of example, but not of limitation, when both the controlling master and the target are on the same PCI bus segment A1 82 performing peer-to-peer operations, SW-A1 78 can be opened and PCI bus segments A2 84 and A1 82 can be operated as a separate logical buses with the arbiter 102 granting the bus segment A1 82 to either a master or segments A1 82 or to the PCI host bridge 76 via PCI-interface 124. Similarly, PCI bus segments B1 90 and B2 92 can be operated as separate logical buses when peer-to-peer operations are occurring on the same PCI bus segment, with the in-line switches providing the isolation. This functional capability adds greater bandwidth to the PCI I/O subsystem.

While the invention has been particularly shown and described with reference to a preferred embodiment, it will be understood by those skilled in the art that various changes in form and detail may be made therein without departing from the spirit and scope of the invention.

What is claimed is:

1. A computer system comprising:
   a system bus connected to a processor and a system memory;
   a plurality of Peripheral Component Interconnect (PCI) local buses;
   a PCI host bridge coupled to said system bus, wherein said PCI host bridge has a plurality of ports, wherein each port is coupled to a particular one of said plurality of PCI local buses, wherein said PCI host bridge contains an internal peer-to-peer bridge whereby transactions may be accomplished between a first one of said plurality of PCI local buses and a second one of said plurality of local buses;
   a plurality of in-line electronic switches coupled to said PCI local buses, wherein said switches are controlled by a bus control logic including an address decoder, range registers and an arbiter control contained within said PCI host bridge; and
   a plurality of PCI slots connected to said plurality of electronic switches for coupling PCI peripherals to said computer system.

2. The computer system according to claim 1, wherein said plurality of in-line electronic switches comprises a first and a second set of in-line electronic switches, wherein said first set of in-line electronic switches couples a first PCI local bus segment to said PCI host bridge and said second set of in-line electronic switches couples a second PCI local bus segment to said host bridge.

3. The computer system according to claim 2, wherein said first PCI local bus segment includes more than one PCI slots and said second PCI local bus segment includes more than one PCI slots, and wherein when one said set of in-line electronic switches are closed the other said set of in-line electronic switches are open.

4. The computer system according to claim 3, wherein said PCI host bridge further includes a plurality of input/output buffers, and wherein said bus control logic controls said first and said second sets of in-line switches in response to the location of a master and a target within said first and said second PCI local bus segments.

5. The computer system according to claim 4, wherein said first set of in-line electronic switches is closed in response to said location of said master being within said first local bus segment and said second set of in-line electronic switches is opened thereby connecting said first local bus segment to said PCI host bridge, whereby a transaction from said master is placed into one of said input/output buffers through one of said PCI Host bridge ports and said PCI host bridge and said peer-to-peer bridge decode an address of said transaction.

6. The computer system according to claim 5, wherein when said address is a location in said system memory, said PCI host bridge responds as said target and forwards information in said input/output buffer via a separate transaction to said system bus.

7. The computer system according to claim 6, wherein if said address is for a device coupled to one of said PCI slots within said second PCI local bus segment, said peer-to-peer bridge responds as said target and terminates said transaction as a delayed transaction or posts said transaction when said transaction is a memory write.

8. The computer system according to claim 6, wherein when said PCI interface is granted access to said first PCI local bus, said switch control logic opens said first set of in-line electronic switches and closes said second set of in-line electronic switches, connecting said second PCI local bus segment to said first PCI local bus and an associated PCI host bridge port and said peer-to-peer bridge completes said separate transaction by sending said forwarded information within said input/output buffers to said PCI device connected at said PCI slot.

9. The computer system according to claim 6, wherein said PCI host bridge connects a second PCI local bus to said system via said PCI switches along said second PCI local bus, said third set of in-line electronic switches couples a third PCI local bus segment to said PCI host bridge and said fourth set of in-line electronic switches couples a fourth PCI local bus segment to said PCI host bridge, and wherein said arbiter control further controls said third and said fourth sets of in-line switches in response to the locating of a second master and a second target within said third and said fourth PCI local bus segments.

10. The computer system according to claim 9, wherein said third PCI local bus segment includes more than one PCI slot and said fourth PCI local bus segment includes more than one PCI slot, and wherein when one set of in-line electronic switches are closed the other said set of in-line electronic switches are open.

11. The computer system according to claim 10, wherein if said address is for a device coupled to one of said PCI slots within said fourth PCI local bus segment, said peer-to-peer bridge responds as said target and terminates said transaction as a delayed transaction or posts said transaction when said transaction is a memory write and said peer-to-peer bridge uses said arbiter control for said second PCI local bus.

12. The computer system according to claim 11, wherein when said PCI host bridge is granted access to said second PCI local bus, said switch control logic closes said fourth set of in-line electronic switches and opens said third set of in-line electronic switches, connecting said fourth PCI local bus segment to said second PCI local bus and said peer-to-peer bridge completes said transaction in said input/output buffers to said PCI device connected at said PCI slot.

13. A method for supporting multiple Peripheral Component Interconnect (PCI) buses comprising:
connecting a processor and a system memory to a system bus;
connecting a plurality of PCI local buses to said system bus via a PCI host bridge having an internal peer-to-peer bridge and a plurality of ports for connection to each of said plurality of PCI local buses, wherein said PCI host bridge contains a bus control logic including an address decoder, range registers and an arbiter control; and
connecting a plurality of PCI peripheral component slots to said plurality of PCI local buses, wherein at least one said PCI peripheral component slot shares data with said processor and said system memory, wherein said plurality of PCI local buses defining a first PCI local bus includes first and second sets of in-line electronic switches, and wherein said first set of in-line electronic switches is coupled to a first PCI local bus segment and said second set of in-line electronic switches is coupled to a second PCI local bus segment, and wherein said first and said second set of in-line electronic switches are coupled to said bus control logic.

14. The method for supporting multiple Peripheral Component Interconnect (PCI) buses according to claim 13, wherein said method further includes the steps of:
attaching more than one PCI peripheral component slots to said first PCI local bus segment; and
attaching more than one PCI peripheral component slots to said second PCI local bus segment, wherein when one said set of in-line electronic switches are closed the other said set of in-line electronic switches are open.

15. The method for supporting multiple Peripheral Component Interconnect (PCI) buses according to claim 14, wherein said method further includes the steps of:
attaching a plurality of input/output buffers and a bus control logic, said bus control logic including address decode, range registers and arbiter control to said PCI host bridge; and
determining when said first and said second sets of in-line switches are open and closed in conformity with the location of a master and a target within said first and said second PCI local bus segments.

16. The method for supporting multiple Peripheral Component Interconnect (PCI) buses according to claim 15, wherein said method further includes the steps of:
determining whether or not said master is located within said first local bus segment;
in response to determining said master is located within said first local bus segment, closing said first set of in-line electronic switches and opening said second set of in-line electronic switches, thereby connecting said first local bus segment to said PCI host bridge;
placing a transaction from said master into one of said input/output buffers through one of said plurality of ports; and
decoding an address of said transaction.

17. The method for supporting multiple Peripheral Component Interconnect (PCI) buses according to claim 16, wherein said method further includes the steps of:
determining whether or not said address is a location in said system memory; and
response to determining that said address is a location in system memory responding as said target from said PCI host bridge, and forwarding information in said input/output buffer via a separate transaction to a system via a system interface.

18. The method for supporting multiple Peripheral Component Interconnect (PCI) buses according to claim 17, wherein said method further includes the steps of:
determining whether or not said address is for a device coupled to one of said PCI peripheral component slots on said second PCI local bus segment; and
in response to determining that said address is for a device coupled to one of said PCI peripheral component slots on said second PCI local bus segment, terminating said transaction as a delayed transaction or posting said transaction when said transaction is a memory write.

19. The method for supporting multiple Peripheral Component Interconnect (PCI) buses according to claim 18, wherein said method further includes the steps of:
determining whether or not said PCI host bridge is granted access to said first PCI local bus;
in response to determining that said PCI host bridge is granted access to said first PCI local bus, opening said first set of in-line electronic switches, and closing said second set of in-line electronic switches, connecting said second PCI local bus segment to said first PCI local bus; and completing said transaction in said input/output buffers to said PCI device connected at said PCI peripheral component slot.

20. A computer system comprising:
a system bus connected to a processor and a system memory;
a plurality of Peripheral Component Interconnect (PCI) local buses;
a PCI host bridge coupled to said system bus, wherein said PCI host bridge has a plurality of ports each coupled to a particular one of said plurality of PCI local buses, wherein said PCI host bridge contains an internal peer-to-peer bridge whereby transactions may be accomplished between a first one of said plurality of PCI local buses and a second one of said plurality of local buses, and wherein said PCI host bridge contains a bus control logic including an address decoder, range registers and an arbiter control; and a plurality of PCI slots connected to said plurality of PCI local buses, wherein at least one said PCI slot shares data with said processor and said system memory, wherein said plurality of PCI local buses comprises a first PCI local bus including a first and a second set of in-line electronic switches controlled by said bus control logic, wherein said first set of in-line electronic switches couples a first PCI local bus segment to said PCI host bridge and said second set of in-line electronic switches couples a second PCI local bus segment to said PCI host bridge, wherein said first PCI local bus segment includes more than one PCI slot and said second PCI local bus segment includes more than one PCI slot, wherein when one said set of in-line electronic switches are closed the other said set of in-line electronic switches are open, wherein said PCI host bridge includes a plurality of input/output buffers and a bus control logic, wherein said bus control logic includes an address decoder, range registers and an arbiter control for controlling said first and said second sets of in-line switches in response to the location of a master and a target within said first and said second PCI local bus segments.

* * * * *